(12) United States Patent
Lee et al.

(10) Patent No.: US 12,496,721 B2
(45) Date of Patent: Dec. 16, 2025

(54) VIRTUAL PRESENCE FOR TELEROBOTICS IN A DYNAMIC SCENE

(71) Applicant: SAMSUNG ELECTRONICS CO., LTD., Suwon-si (KR)

(72) Inventors: Ken Lee, Fairfax, VA (US); Craig Cambias, Silver Spring, MD (US); Xin Hou, Herndon, VA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 273 days.

(21) Appl. No.: 17/314,866

(22) Filed: May 7, 2021

(65) Prior Publication Data
US 2021/0347053 A1  Nov. 11, 2021

Related U.S. Application Data

(60) Provisional application No. 63/022,113, filed on May 8, 2020.

(51) Int. Cl.
| | |
|---|---|
| *B25J 9/16* | (2006.01) |
| *B25J 13/00* | (2006.01) |
| *G05D 1/00* | (2024.01) |

(52) U.S. Cl.
CPC .......... *B25J 9/1689* (2013.01); *B25J 9/1653* (2013.01); *B25J 9/1697* (2013.01); *B25J 13/006* (2013.01);
(Continued)

(58) Field of Classification Search
CPC ...... B25J 9/1689; B25J 9/1653; B25J 9/1697; B25J 13/006; B25J 13/00; G05D 1/0038;
(Continued)

(56) References Cited

U.S. PATENT DOCUMENTS

| | | |
|---|---|---|
| 5,675,326 A | 10/1997 | Juds et al. |
| 6,259,815 B1 | 7/2001 | Anderson et al. |

(Continued)

FOREIGN PATENT DOCUMENTS

| | | | |
|---|---|---|---|
| CN | 111383348 A | * | 7/2020 |
| EP | 1308902 A2 | | 5/2003 |

(Continued)

OTHER PUBLICATIONS

Miroslav Trajkovic, Mark Hedley, "Fast corner detection", Image and Vision Computing, vol. 16, Issue 2, 1998, pp. 75-87.*

(Continued)

*Primary Examiner* — Jason Holloway
*Assistant Examiner* — Blake A Wood
(74) *Attorney, Agent, or Firm* — Sughrue Mion, PLLC

(57) ABSTRACT

Described herein are methods and systems for providing virtual presence for telerobotics in a dynamic scene. A sensor captures frames of a scene comprising one or more objects. A computing device generates a set of feature points corresponding to objects in the scene and matches the set of feature points to 3D points in a map of the scene. The computing device generates a dense mesh of the scene and the objects using the matched feature points and transmits the dense mesh the frame to a remote viewing device. The remote viewing device generates a 3D representation of the scene and the objects for display to a user and receives commands from the user corresponding to interaction with the 3D representation of the scene. The remote viewing device transmits the commands to a robot device that executes the commands to perform operations on the objects in the scene.

20 Claims, 10 Drawing Sheets

(52) U.S. Cl.
CPC ......... *G05D 1/0038* (2013.01); *G05D 1/0044* (2013.01)

(58) Field of Classification Search
CPC ....... G05D 1/0044; G05D 2219/40131; G05D 2201/0207; G05D 2201/0218
See application file for complete search history.

(56) References Cited

U.S. PATENT DOCUMENTS

| | | |
|---|---|---|
| 6,275,235 B1 | 8/2001 | Morgan, III |
| 6,525,722 B1 | 2/2003 | Deering |
| 6,525,725 B1 | 2/2003 | Deering |
| 7,248,257 B2 | 7/2007 | Elber |
| 7,420,555 B1 | 9/2008 | Lee |
| 7,657,081 B2 | 2/2010 | Blais et al. |
| 8,209,144 B1 | 6/2012 | Anguelov et al. |
| 8,542,233 B2 | 9/2013 | Brown |
| 8,766,979 B2 | 7/2014 | Lee et al. |
| 8,942,917 B2 | 1/2015 | Chrysanthakopoulos |
| 8,995,756 B2 | 3/2015 | Lee et al. |
| 9,041,711 B1 | 5/2015 | Hsu |
| 9,104,908 B1 | 8/2015 | Rogers et al. |
| 9,171,402 B1 | 10/2015 | Allen et al. |
| 9,607,388 B2 | 3/2017 | Lin et al. |
| 9,710,960 B2 | 7/2017 | Hou |
| 9,886,530 B2 | 2/2018 | Mehr et al. |
| 9,978,177 B2 | 5/2018 | Mehr et al. |
| 10,467,792 B1 | 11/2019 | Roche et al. |
| 2005/0068317 A1 | 3/2005 | Amakai |
| 2005/0128201 A1 | 6/2005 | Warner et al. |
| 2005/0253924 A1 | 11/2005 | Mashitani |
| 2006/0050952 A1 | 3/2006 | Blais et al. |
| 2006/0170695 A1 | 8/2006 | Zhou et al. |
| 2006/0277454 A1 | 12/2006 | Chen |
| 2007/0075997 A1 | 4/2007 | Rohaly et al. |
| 2008/0180448 A1 | 7/2008 | Anguelov et al. |
| 2008/0310757 A1* | 12/2008 | Wolberg .............. G06V 20/653 382/285 |
| 2009/0232353 A1 | 9/2009 | Sundaresan et al. |
| 2010/0111370 A1 | 5/2010 | Black et al. |
| 2010/0198563 A1 | 8/2010 | Plewe |
| 2010/0209013 A1 | 8/2010 | Minear et al. |
| 2010/0302247 A1 | 12/2010 | Perez et al. |
| 2011/0052043 A1 | 3/2011 | Hyung et al. |
| 2011/0074929 A1 | 3/2011 | Hebert et al. |
| 2012/0056800 A1 | 3/2012 | Williams et al. |
| 2012/0063672 A1 | 3/2012 | Gordon et al. |
| 2012/0098937 A1 | 4/2012 | Sajadi et al. |
| 2012/0130762 A1 | 5/2012 | Gale et al. |
| 2012/0194516 A1 | 8/2012 | Newcombe et al. |
| 2012/0194517 A1 | 8/2012 | Izadi et al. |
| 2012/0306876 A1 | 12/2012 | Shotton et al. |
| 2013/0069940 A1 | 3/2013 | Sun et al. |
| 2013/0123801 A1 | 5/2013 | Umasuthan et al. |
| 2013/0156262 A1 | 6/2013 | Taguchi et al. |
| 2013/0201104 A1 | 8/2013 | Ptucha et al. |
| 2013/0201105 A1 | 8/2013 | Ptucha et al. |
| 2013/0208955 A1 | 8/2013 | Zhao et al. |
| 2013/0346348 A1* | 12/2013 | Buehler .................. G06F 17/00 901/31 |
| 2014/0160115 A1 | 6/2014 | Keitler et al. |
| 2014/0176677 A1 | 6/2014 | Valkenburg et al. |
| 2014/0206443 A1 | 7/2014 | Sharp et al. |
| 2014/0240464 A1 | 8/2014 | Lee |
| 2014/0241617 A1 | 8/2014 | Shotton et al. |
| 2014/0270484 A1 | 9/2014 | Chandraker et al. |
| 2014/0321702 A1 | 10/2014 | Schmalstieg |
| 2015/0009214 A1 | 1/2015 | Lee et al. |
| 2015/0045923 A1 | 2/2015 | Chang et al. |
| 2015/0142394 A1 | 5/2015 | Mehr et al. |
| 2015/0213572 A1 | 7/2015 | Loss |
| 2015/0234477 A1 | 8/2015 | Abovitz et al. |
| 2015/0262405 A1 | 9/2015 | Black et al. |
| 2015/0269715 A1 | 9/2015 | Jeong et al. |
| 2015/0279118 A1 | 10/2015 | Dou et al. |
| 2015/0301592 A1 | 10/2015 | Miller |
| 2015/0325044 A1 | 11/2015 | Lebovitz |
| 2015/0371440 A1 | 12/2015 | Pirchheim et al. |
| 2016/0026253 A1 | 1/2016 | Bradski et al. |
| 2016/0071318 A1 | 3/2016 | Lee et al. |
| 2016/0171765 A1 | 6/2016 | Mehr |
| 2016/0173842 A1 | 6/2016 | De La Cruz et al. |
| 2016/0358382 A1 | 12/2016 | Lee et al. |
| 2017/0053447 A1 | 2/2017 | Chen et al. |
| 2017/0054954 A1 | 2/2017 | Keitler et al. |
| 2017/0054965 A1 | 2/2017 | Raab et al. |
| 2017/0221263 A1 | 8/2017 | Wei et al. |
| 2017/0243397 A1 | 8/2017 | Hou et al. |
| 2017/0278293 A1 | 9/2017 | Hsu |
| 2017/0316597 A1 | 11/2017 | Ceylan et al. |
| 2017/0337726 A1 | 11/2017 | Bui et al. |
| 2018/0005015 A1 | 1/2018 | Hou et al. |
| 2018/0025529 A1 | 1/2018 | Wu et al. |
| 2018/0114363 A1 | 4/2018 | Rosenbaum |
| 2018/0144535 A1 | 5/2018 | Ford et al. |
| 2018/0284802 A1* | 10/2018 | Tsai ...................... G05D 1/027 |
| 2018/0288387 A1 | 10/2018 | Somanath et al. |
| 2018/0300937 A1 | 10/2018 | Chien et al. |
| 2019/0114832 A1* | 4/2019 | Park ........................ G06T 7/579 |
| 2019/0208007 A1 | 7/2019 | Khalid |
| 2019/0244412 A1 | 8/2019 | Yago Vicente et al. |
| 2019/0251728 A1 | 8/2019 | Stoyles et al. |
| 2020/0086487 A1 | 3/2020 | Johnson et al. |
| 2020/0105013 A1 | 4/2020 | Chen |

FOREIGN PATENT DOCUMENTS

| | | |
|---|---|---|
| KR | 10-1054736 B1 | 8/2011 |
| KR | 10-2011-0116671 A | 10/2011 |
| WO | 2006027339 A2 | 3/2006 |

OTHER PUBLICATIONS

D. Holz, A. E. Ichim, F. Tombari, R. B. Rusu and S. Behnke, "Registration with the Point Cloud Library: A Modular Framework for Aligning in 3-D," in IEEE Robotics & Automation Magazine, vol. 22, No. 4, pp. 110-124, Dec. 2015, doi: 10.1109/MRA.2015.2432331.*

English Machine translation of CN111383348A, Accessed Jan. 20, 2023.*

S. Gaurav, Z. Al-Qurashi, A. Barapatre, G. Maratos, T. Sarma and B. D. Ziebart, "Deep Correspondence Learning for Effective Robotic Teleoperation using Virtual Reality," 2019 IEEE-RAS 19th International Conference on Humanoid Robots (Humanoids), Toronto, ON, Canada, 2019, pp. 477-483, doi: 10.1109/Humanoids43949.2.*

S. Lieberknecht, A. Huber, S. Ilic and S. Benhimane, "RGB-D camera-based parallel tracking and meshing," 2011 10th IEEE International Symposium on Mixed and Augmented Reality, Basel, Switzerland, 2011, pp. 147-155, doi: 10.1109/ISMAR.2011.6092380.*

Zollhofer, Michael, et al. "Real-time non-rigid reconstruction using an RGB-D camera." ACM Transactions on Graphics (ToG) 33.4 (2014): 1-12. Accessed Apr. 29, 2024.*

Wang, Kangkan, Guofeng Zhang, and Shihong Xia. "Templateless non-rigid reconstruction and motion tracking with a single RGB-D camera." IEEE Transactions on Image Processing 26.12 (2017): 5966-5979.*

Rossignac, J. et al., "3D Compression Made Simple: Edgebreaker on a Corner-Table," Invited lecture at the Shape Modeling International Conference, Genoa, Italy (Jan. 30, 2001), pp. 1-6.

Melax, S., "A Simple, Fast, and Effective Polygon Reduction Algorithm," Game Developer, Nov. 1998, pp. 44-49.

Myronenko, A. et al., "Point Set Registration: Coherent Point Drift," IEEE Transactions on Pattern Analysis and Machine Intelligence, vol. 32, No. 12, Dec. 2010, pp. 2262-2275.

Bookstein, F., "Principal Warps: Thin-Plate Splines and the Decomposition of Deformations," IEEE Transactions on Pattern Analysis and Machine Intelligence, vol. 11, No. 6, Jun. 1989, pp. 567-585.

(56) References Cited

OTHER PUBLICATIONS

Izadi, S. et al., "KinectFusion: Real-time 3D Reconstruction and Interaction Using a Moving Depth Camera," UIST '11, Oct. 16-19, 2011, 10 pages.
Papazov, C. et al., "An Efficient RANSAC for 3D Object Recognition in Noisy and Occluded Scenes," presented at Computer Vision—ACCV 2010—10th Asian Conference on Computer Vision, Queenstown, New Zealand, Nov. 8-12, 2010, 14 pages.
Biegelbauer, Georg et al., "Model-based 3D object detection—Efficient approach using superquadrics," Machine Vision and Applications, Jun. 2010, vol. 21, Issue 4, pp. 497-516.
Kanezaki, Asako et al., "High-speed 3D Object Recognition Using Additive Features in a Linear Subspace," 2010 EEE International Conference on Robotics and Automation, Anchorage Convention District, May 3-8, 2010, pp. 3128-3134.
International Search Report and Written Opinion from PCT patent application No. PCT/US13/062292, dated Jan. 28, 2014, 10 pages.
International Search Report and Written Opinion from PCT patent application No. PCT/US14/045591, dated Nov. 5, 2014, 9 pages.
Sumner, R. et al., "Embedded Deformation for Shape Manipulation," Applied Geometry Group, ETH Zurich, SIGGRAPH 2007, 7 pages.
Rosten, Edward, et al., "Faster and better: a machine learning approach to corner detection," arXiv:08102.2434v1 [cs.CV], Oct. 14, 2008, available at https://arxiv.org/pdf/0810.2434.pdf, 35 pages.
Kim, Young Min, et al., "Guided Real-Time Scanning of Indoor Objects," Computer Graphics Forum, vol. 32, No. 7 (2013), 10 pages.
Rusinkewicz, Szymon, et al., "Real-time 3D model acquisition," ACM Transactions on Graphics (TOG) 21.3 (2002), pp. 438-446.
European Search Report from European patent application No. EP 15839160, dated Feb. 19, 2018, 8 pages.
Liu, Song, et al., "Creating Simplified 3D Models with High Quality Textures," arXiv:1602.06645v1 [cs.GR], Feb. 22, 2016, 9 pages.
Stoll, C., et al., "Template Deformation for Point Cloud Filtering," Eurographics Symposium on Point-Based Graphics (2006), 9 pages.
Allen, Brett, et al., "The space of human body shapes: reconstruction and parameterization from range scans," ACM Transactions on Graphics (TOG), vol. 22, Issue 3, Jul. 2003, pp. 587-594.
International Search Report and Written Opinion from PCT patent application No. PCT/US15/49175, dated Feb. 19, 2016, 14 pages.
Harris, Chris & Mike Stephens, "A Combined Corner and Edge Detector," Plessey Research Roke Manor, U.K. (1988), pp. 147-151.
Bay, Herbert, et al., "Speeded-Up Robust Features (SURF)," Computer Vision and Image Understanding 110 (2008), pp. 346-359.
Rublee, Ethan, et al., "ORB: an efficient alternative to SIFT or SURF," Willow Garage, Menlo Park, CA (2011), available from http://citeseerx.ist.psu.edu/viewdoc/download?doi=10.1.1.370.4395&rep=rep1&type=pdf, 8 pages.
Lowe, David G., "Distinctive Image Features from Scale-Invariant Keypoints," International Journal of Computer Vision, vol. 60, Issue 2, Nov. 2004, pp. 91-110.
Kaess, Michael, et al., "iSAM: Incremental Smoothing and Mapping," IEEE Transactions on Robotics, Manuscript, Sep. 7, 2008, 14 pages.
Kummerle, Rainer, et al., "g2o: A General Framework for Graph Optimization," 2011 IEEE International Conference on Robotics and Automation, May 9-13, 2011, Shanghai, China, 7 pages.

\* cited by examiner

VIRTUAL PRESENCE FOR TELEROBOTICS IN A DYNAMIC SCENE

RELATED APPLICATIONS

This application claims priority to U.S. Provisional Patent Application No. 63/022,113, filed on May 8, 2020, the entirety of which is incorporated herein by reference.

TECHNICAL FIELD

This subject matter of this application relates generally to methods and apparatuses, including computer program products, for providing virtual presence for telerobotics in a dynamic scene.

BACKGROUND

Telerobotics refers to the field of humans having the ability to control robots from a location that is remote from the robot's location. A good example of telerobotics in action is the Mars Rover exploration mission or the use of bomb disposal robots. It should be appreciated that telerobotics is different from other robotics applications, where fully autonomous robots do not require any real-time human interaction (e.g., manufacturing) because they typically utilize machine learning for mostly simple tasks. The advantage that telerobotics provides is the ability to perform very complex tasks in real-world environments by combining human intelligence with robotic technology. Telerobotics can be applied in many different fields and industries, including but not limited to manufacturing, health care, agriculture, and security, where the workers/users do not have to be co-located with the robot. In fact, in more advanced forms of telerobotics, the robot can be controlled from anywhere in the world (e.g., using a networked connection such as the Internet).

However, one of the most challenging problems currently faced in telerobotics applications is how to enable the human operator to be 'fully immersed' in the remote environment where the robot is located. Current telerobotics systems attempt to achieve such immersion by using a camera which live-streams' what the robot sees. Based on this visual (and in some cases, audio as well) feedback and perception, a human operator can direct the robot appropriately. However, many cameras used in telerobotics have a limited field of view or limited stereo perception which makes achieving 'immersion' very difficult, and the outcome is typically less than ideal for most tasks. Secondly, in a dynamic scene (i.e., the scene is changing relative to time), there could be a significant delay between what is happening in the actual scene in real-time (e.g., movement of objects, orientation of the robot, etc.) versus what the 'tele-operator' (the person controlling the robot) sees, due to factors such as network delay in transmitting the camera live stream from the robot location to the tele-operator location. As a result, in dynamically changing scenes, accurate and timely control of robots is very difficult. For example, if an object is moving in the scene, the tele-operator would likely struggle to pick up the object using a robot arm because, due to the above-mentioned network time lag, the object would have already moved away from the location that the tele-operator sees. Also, it should be appreciated that in an extremely bandwidth-limited system it may be even harder to give the operator enough information to accurately control the robot. If a high definition or standard definition video stream is not supported, then the operator's task becomes impossible.

SUMMARY

The invention described herein overcomes the above challenges that exist in current telerobotics systems by providing a virtual presence for the tele-operator in the scene based on dynamic Simultaneous Localization and Mapping (SLAM) technology which replicates the robot environment to the tele-operator in true three-dimensional geometrically and scale correct (3D) space and further live-streams any dynamic changes in the scene to the tele-operator. The tele-operator can take advantage of this virtually 'mirrored' 3D environment via, e.g., an Augmented Reality (AR)/Virtual Reality (VR) head-mounted display (HMD), headset and/or apparatus to be fully immersed into the robot's environment. Furthermore, the systems and methods described herein advantageously leverage dynamic SLAM technology to provide precise location information of the scene and objects with respect to the robot, by tracking the locations of the objects within the scene semi-autonomously—which can be beneficially used to control actions and features of the robot (e.g., manipulation of a robot arm, movement of the robot, etc.).

The invention, in one aspect, features a system for providing virtual presence for telerobotics in a dynamic scene. The system includes a remote viewing device and a remote controller coupled to the remote viewing device. The system includes a sensor device that captures one or more frames of a scene comprising one or more objects, each frame comprising (i) one or more color images of the scene and the one or more objects and (ii) one or more depth maps of the scene and the one or more objects. The system includes a robot device that interacts with one or more of the objects in the scene. The system includes a computing device coupled to the sensor device, the computing device comprising a memory that stores computer-executable instructions and a processor that executes the instructions. The computing device generates, for each frame, a set of feature points corresponding to one or more of the objects in the scene. The computing device matches, for each frame, the set of feature points to one or more corresponding 3D points in a map of the scene. The computing device generates, for each frame, a dense mesh of the scene and the one or more objects using the matched feature points. The computing device transmits, for each frame, (i) the dense mesh of the scene and the one or more objects and (ii) the frame to the remote viewing device. The remote viewing device generates a 3D representation of the scene and the one or more objects using the dense mesh and the frame for display to a user. The remote viewing device receives one or more commands from the user via the remote controller, the one or more commands corresponding to interaction with one or more of the objects in the 3D representation of the scene. The remote viewing device transmits the commands to the robot device. The robot device executes the commands received from the remote viewing device to perform one or more operations.

The invention, in another aspect, features a computerized method for providing virtual presence for telerobotics in a dynamic scene. A sensor device captures one or more frames of a scene comprising one or more objects, each frame comprising (i) one or more color images of the scene and the one or more objects and (ii) one or more depth maps of the scene and the one or more objects. A computing device coupled to the sensor device generates, for each frame, a set of feature points corresponding to one or more of the objects in the scene. The computing device matches, for each frame, the set of feature points to one or more corresponding 3D points in a map of the scene. The computing device generates, for each frame, a dense mesh of the scene and the one or more objects using the matched feature points. The computing device transmits, for each frame, (i) the dense mesh of the scene and the one or more objects and (ii) the frame to a remote viewing device coupled to a remote controller. The remote viewing device generates a 3D representation of the scene and the one or more objects using the dense mesh and the frame for display to a user. The remote viewing device receives one or more commands from the user via the remote controller, the one or more commands corresponding to interaction with one or more of the objects in the 3D representation of the scene. The remote viewing device transmits the commands to a robot device that interacts with one or more of the objects in the scene. The robot device executes the commands received from the remote viewing device to perform one or more operations.

Any of the above aspects can include one or more of the following features. In some embodiments, generating a set of feature points corresponding to one or more of the objects in the scene comprises detecting one or more feature points in the frame using a corner detection algorithm. In some embodiments, matching the set of feature points to one or more corresponding 3D points in a map of the scene comprises using a feature descriptor to match the feature points to the corresponding 3D points. In some embodiments, matching the set of feature points to one or more corresponding 3D points in a map of the scene comprises minimizing a projection error between each feature point and one or more corresponding 3D points. In some embodiments, minimizing a projection error is performed using a nonlinear optimization algorithm.

In some embodiments, generating a 3D representation of the scene and the one or more objects using the dense mesh and the frame comprises: detecting one or more keypoints of one or more objects in the scene using the received frame; matching the detected keypoints to one or more 3D points in a stored map to generate a point cloud; matching the generated point cloud to the dense mesh received from the computing device; and mapping the frame onto a surface of the dense mesh to generate the 3D representation. In some embodiments, matching the generated point cloud to the dense mesh is performed using an Iterative Closest Point (ICP) algorithm. In some embodiments, the 3D representation comprises a textured mesh of the scene and the one or more objects in the scene.

In some embodiments, the computing device deforms at least a portion of the dense mesh based upon a geometric error calculated between the one or more depth maps and the dense mesh. In some embodiments, the remote viewing device comprises an augmented reality (AR) viewing apparatus, a virtual reality (VR) viewing apparatus, or a mixed reality (MR) viewing apparatus. In some embodiments, the remote viewing device is worn by the user.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
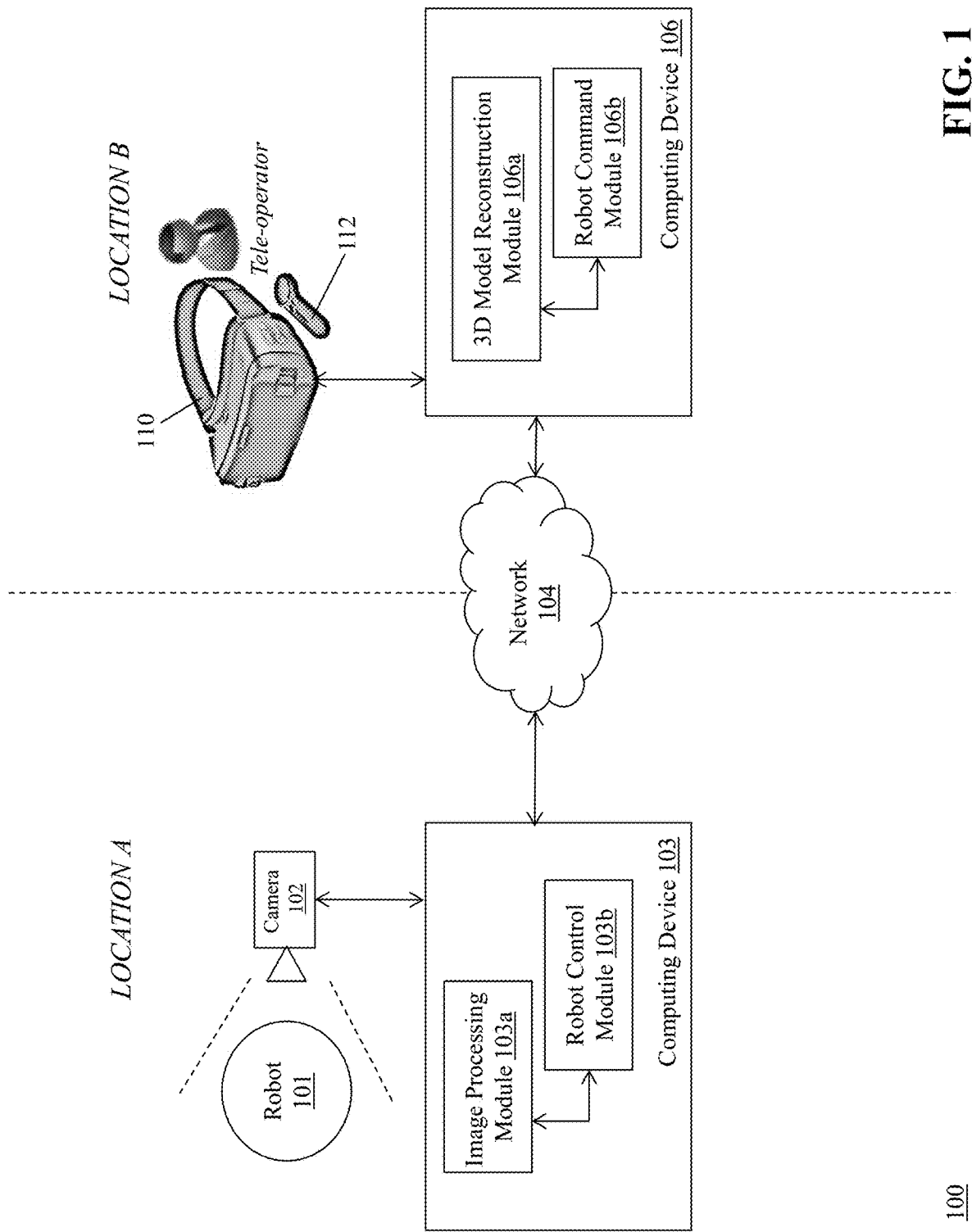
FIG. 1 is a block diagram of a system for providing virtual presence for telerobotics in a dynamic scene.

FIG. 1 is a block diagram of a system 100 for providing virtual presence for telerobotics in a dynamic scene. In some embodiments, the system 100 comprises hardware (e.g., computing devices) and software. Exemplary hardware and software used by the system 100 can be arranged at both the robot location and the tele-operator location, such as:

Robot Location (Location A)
  Robot or robotic device (e.g. robot 101): i.e., any robot that can be remotely controlled.
  One or more camera(s) (e.g. camera 102)—for example, an RGB and depth/stereo camera, such as an Intel® RealSense™ depth sensor available from Intel Corp. Such camera(s) provides real-time depth map information (e.g., 30 FPS) along with RGB images that are calibrated and time-synchronized to the depth map information. In addition, the position of each camera 102 is registered to the robot 101 such that the system 100 knows the precise relative position between the robot 101 and the respective camera 102. As a result, this advantageously enables control of the robot 101 based on the camera pose (i.e., location and orientation). In some embodiments, at least one camera 102 is physically coupled to the robot 101 (e.g. on an arm of the robot).
  Networking components and connectivity—e.g., a connection to a communications network (e.g. network 104), such as the Internet, a private network (wide area network (WAN)/local area network (LAN)), or similar infrastructure (preferably a high-speed connection) that enables the components at the robot location A to connect to and communicate with remote computing devices (such as the device(s) (e.g. computing device 106) at the tele-operator location B).
  Dynamic SLAM software—e.g., software (as represented by image processing module 103*a* at computing device 103) that provides real-time tracking and mapping for the dynamic scene and object(s) therein, to map the changing scene and moving objects around the robot 101 and provide real-time pose information. The dynamic SLAM software also performs a 3D object reconstruction process in order to provide one or more photo-realistic 3D model(s) for the visualization by the tele-operator. In some embodiments, the Dynamic SLAM software resides in a processing/computing unit (such as computing device 103) that is local to the robot 101. In some embodiments, because the tele-operator location already has a complete 3D model, the processing module 103a of computing device 103 only transmits changes to the scene or updated pose of the object to the 3D model reconstruction module 106a of computing device 106 at the tele-operator location B, so that the 3D reconstruction of the dynamic scene by the processing module 106a can be generated and modified with minimal amount of network traffic and hence minimal latency.

Robot control software—e.g., software (as represented by robot control module 103b of computing device 103) that converts commands and instructions from the robot command module 106b of computing device 106 as initiated by the tele-operator, and the pose information provided by the Dynamic SLAM software (e.g. module 103a), to guide, e.g., robot navigation or an arm controller to precisely move the robot 101 to the correct location, orientation, and position for a certain task, such as grabbing objects.

Tele-Operator Location B

AR/VR headset or apparatus (e.g. device 110)—this device provides an 'immersive' visual experience for the tele-operator to make it seem as if the operator is physically located at the robot's location A.

Robot controller (e.g. controller 112)—e.g., this device (e.g., joystick, control pad, glove, or other type of user input mechanism) can be the controller that comes with the AR/VR headset 110 or other types of haptic controller(s) that can mimic hand-finger movements. In some embodiments, the tele-operator can utilize a control-free mechanism for interacting with the VR environment, such as one or more sensors that detect the position, movement, gestures, and orientation of the tele-operator's hands/body/head and convert that data into control commands.

Networking components and connectivity—e.g., a connection to a communication network (e.g. network 104) such as the Internet, a private network (WAN/LAN), or similar infrastructure (preferably a high-speed connection) that enables the components at the tele-operator location B to connect to and communicate with remote computing devices (such as the device(s) (e.g. computing device 103) at the robot location A).

Software (e.g. 3D model reconstruction module 106a) used in conjunction with the AR/VR headset 110 to render and display a real-time dynamic scene (e.g., as existing at the robot location A) in true 3D. Because the system 100 has the exact geometry and spatial information generated with the help of the depth camera 102 (which typically is accurate to millimeters), this 3D space shown to the tele-operator in the AR/VR headset 110 is a complete replica of the dynamic scene of the robot workspace at location A—although with a network delay.

Conversion software (e.g. robot command module 106b) that converts the input that the tele-operator generates with the robot controller 112 into commands that can cause the robot 101 to perform certain action(s) (e.g., move, turn, pick up objects, etc.). These commands are sent to the robot location A for ingestion and processing by the robot 101 via the robot control module 103b of computing device 103.

In some embodiments, the computing device 106 further comprises network software that enables computing device(s) at the tele-operator location B to connect to and control the robot 101 (either directly or via robot control module 103b).

As can be appreciated, the modules 103a, 103b of computing device 103 and the modules 106a, 106b of computing device 106 are hardware and/or software modules that reside on the respective computing devices 103, 106 to perform functions associated with providing virtual presence for telerobotics in a dynamic scene as described herein. In some embodiments, the functionality of the modules 103a, 103b, 106a, 106b can be distributed among a plurality of additional computing devices (not shown). In some embodiments, the modules 103a, 103b, 106a, 106b operate in conjunction with other modules that are either also located on the respective computing devices 103, 106 or on other computing devices coupled to the computing devices 103, 106. It should be appreciated that any number of computing devices, arranged in a variety of architectures, resources, and configurations (e.g., cluster computing, virtual computing, cloud computing) can be used without departing from the scope of the invention.

In some embodiments, the functionality of computing device 106 can be embedded into the AR/VR headset 110 such that the AR/VR headset 110 can be directly coupled to network 104. Furthermore, it should be appreciated that in some embodiments, one or more of the modules 103a, 103b, 106a, 106b comprises specialized hardware (such as a processor or system-on-chip) that is embedded into, e.g., a circuit board or other similar component. In such embodiments, the modules 103a, 103b, 106a, 106b are specifically programmed with the corresponding functionality described herein.

Overview

As can be appreciated, the invention described herein relates to a telerobotics system (as shown in FIG. 1) designed with an immersive user environment and a predictive control system that compensates for problems due to, e.g., high lag time in both network communications and robot motor response to user input. In some embodiments, there are three main parts to the system: (i) generation of a virtual environment that allows the user to examine the current state of the robot location, (ii) a non-rigid tracking algorithm that can update the virtual environment as the corresponding robot environment changes, and (iii) an object tracking and motion prediction system that can guide the robot to complete high-level tasks.

Static Map with Embedded Camera/Sensor Data

Using a VR headset 110 in a telerobotics application gives the tele-operator the sense that the tele-operator is 'present' in the robot's scene and also quickly provides a large amount of information to the tele-operator. Current solutions in the telerobotics area present camera imagery captured at the robot's location directly to the user. However, this approach has two problems: first, the tele-operator may want to view the scene from an angle that the robot cannot reach, and second, lag in the network and/or the robot's movement make it very difficult to synchronize the VR view with the actual camera view. This can cause frustration, dizziness, and nausea in the user.

The invention described herein solves this problem by presenting the tele-operator with a virtual view that directly corresponds to the real scene of the robot. The system uses color and depth sensor data to generate a model that corresponds directly to the real environment. The system then merges the sensor data with the generated model, which is then rendered from any viewpoint that the tele-operator requests.

Figure 2:
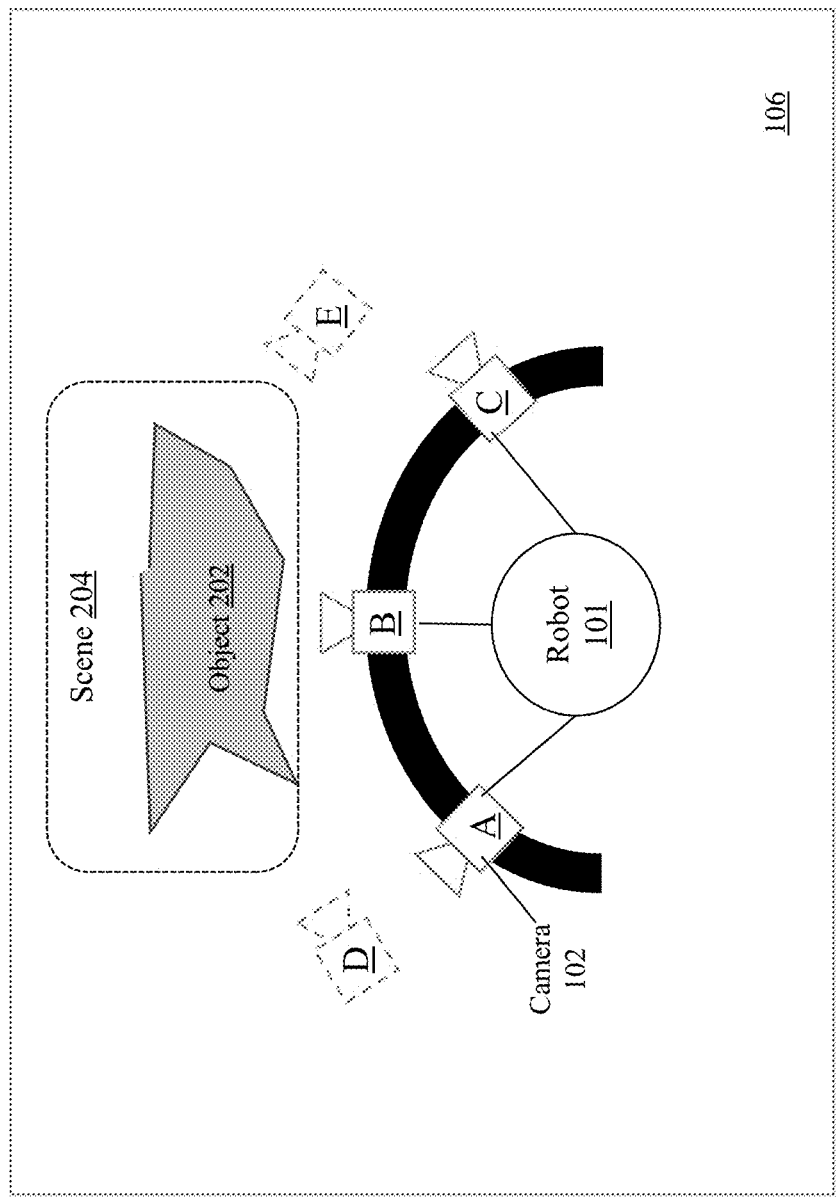
FIG. 2 is a diagram depicting a sensor view of the dynamic scene and a synthetic view of the dynamic scene using the techniques described herein.

For example, as shown in FIG. 2, a camera (e.g. camera 102 as described above in FIG. 1) is examining an object 202 in a scene 204. The camera 102 is able to move in an arc and position itself at locations A, B, and C—for example, the camera 102 can be affixed to an arm of the robot 101 which can move the camera between positions A, B, and C. In other embodiments, the camera 102 is separate from the robot 101 and the camera 102 can be controlled independently of the robot 101 (which can move around the scene). The tele-operator would like to view the scene from locations D and E as well, but the robot 101 or camera 102 (or both) is not physically capable of moving to those locations (D and E). Despite this limitation, the system 100 as described herein advantageously overcomes this limitation to generate a synthetic image from these locations by combining map data with live sensor data.

In order to create this virtual environment, the system 100 first creates a static map of the scene (e.g. location A) using SLAM. The system 100 then constantly localizes the robot 101 within the map and fuses sensor data with the map display to seamlessly integrate live imagery atop the scene geometry.

Figure 3:
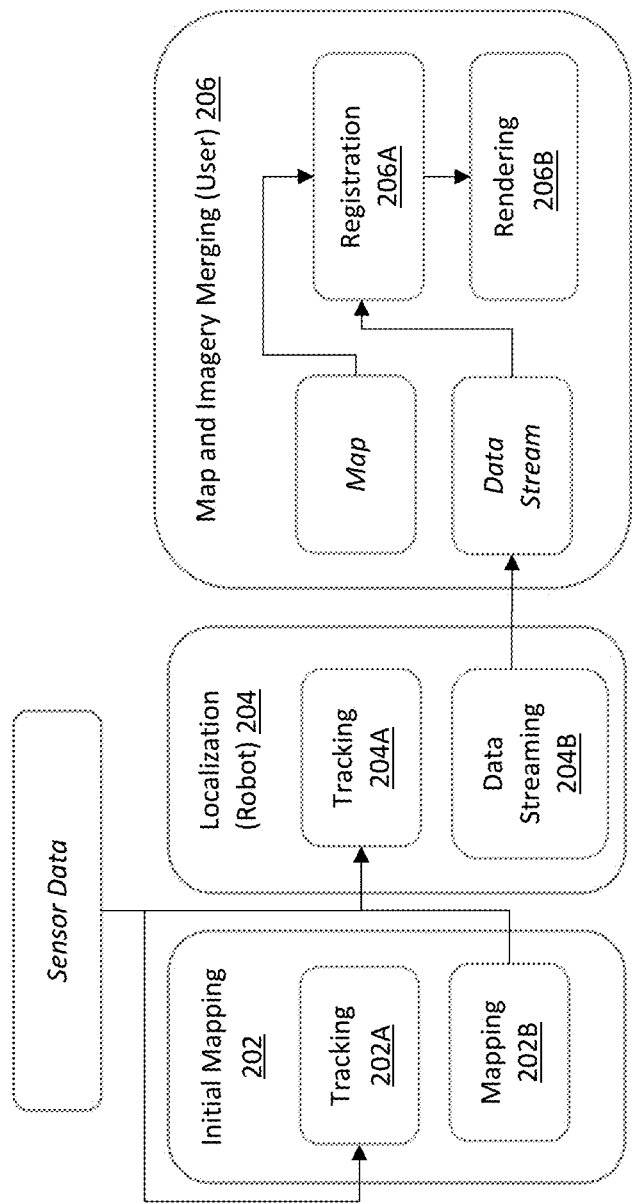
FIG. 3 is a flow diagram of a computerized method for providing virtual presence for telerobotics in a dynamic scene.

FIG. 3 is a flow diagram of a computerized method 300 for generating a virtual presence for telerobotics in a dynamic scene, using the system 100 of FIG. 1.

Virtual Environment

As can be appreciated, the tele-operator wishes to perform one or more tasks within the actual environment surrounding the robot 101. To do this effectively, the tele-operator must have a good sense of the full extent of the environment, the objects within the environment, and how the entire scene changes over time. The tele-operator may wish to move within the scene and examine it from many directions. It is also useful to be able to accurately measure sizes and distances and predict the result of manipulating objects. To this end, the virtual environment is a geometrically accurate representation of reality. The system 100 described herein uses depth cameras (e.g. camera 102) when capturing the real-life scene that allows the system to recreate the scene virtually with a correct sense of scale; e.g., moving a meter within the virtual environment corresponds to moving a meter in the real one. The virtual environment is updated with imagery coming from the cameras incorporated into the robotic system. This allows the tele-operator to see the current conditions of the objects within the scene.

Initial Mapping (FIG. 3, Step 302)

In order to give the tele-operator a sense of the scene beyond the immediate sensor data, the system 100 needs to have a renderable mesh and a way to link that mesh to the robot's current location in the scene. The image processing module 103a of computing device 103 generates the renderable mesh by capturing an initial data sequence and feeding the initial data sequence into a SLAM (Simultaneous Localization and Mapping) component of the module 103a, which finds a relative pose between all frames. The output of the SLAM component is a map consisting of a set of keypoints that can be tracked and a corresponding dense mesh describing the 3D geometry of the scene. The initial mapping step 302 can be partitioned into two sub-steps: tracking 302A and mapping 302B, as described below. This process of generating photo-realistic 3D model representation of the real-world scene and objects has been disclosed in the following patents and publications, which are incorporated herein by reference in their entirety:

U.S. Pat. No. 9,715,761, titled "Real-Time 3D Computer Vision Processing Engine for Object Recognition, Reconstruction, and Analysis," issued Jul. 25, 2017;

U.S. Pat. No. 9,710,960, titled "Closed-Form 3D Model Generation of Non-Rigid Complex Objects from Incomplete and Noisy Scans," issued Jul. 18, 2017;

U.S. Pat. No. 10,192,347, titled "3D Photogrammetry," issued Jan. 29, 2019;

U.S. patent application Ser. No. 16/421,822, titled "Keyframe-Based Object Scanning and Tracking," filed on May 24, 2019 and published as U.S. Patent Application Publication No. 2019/0362157 on Nov. 28, 2019.

Tracking (FIG. 3, Step 302A)

Figure 4:
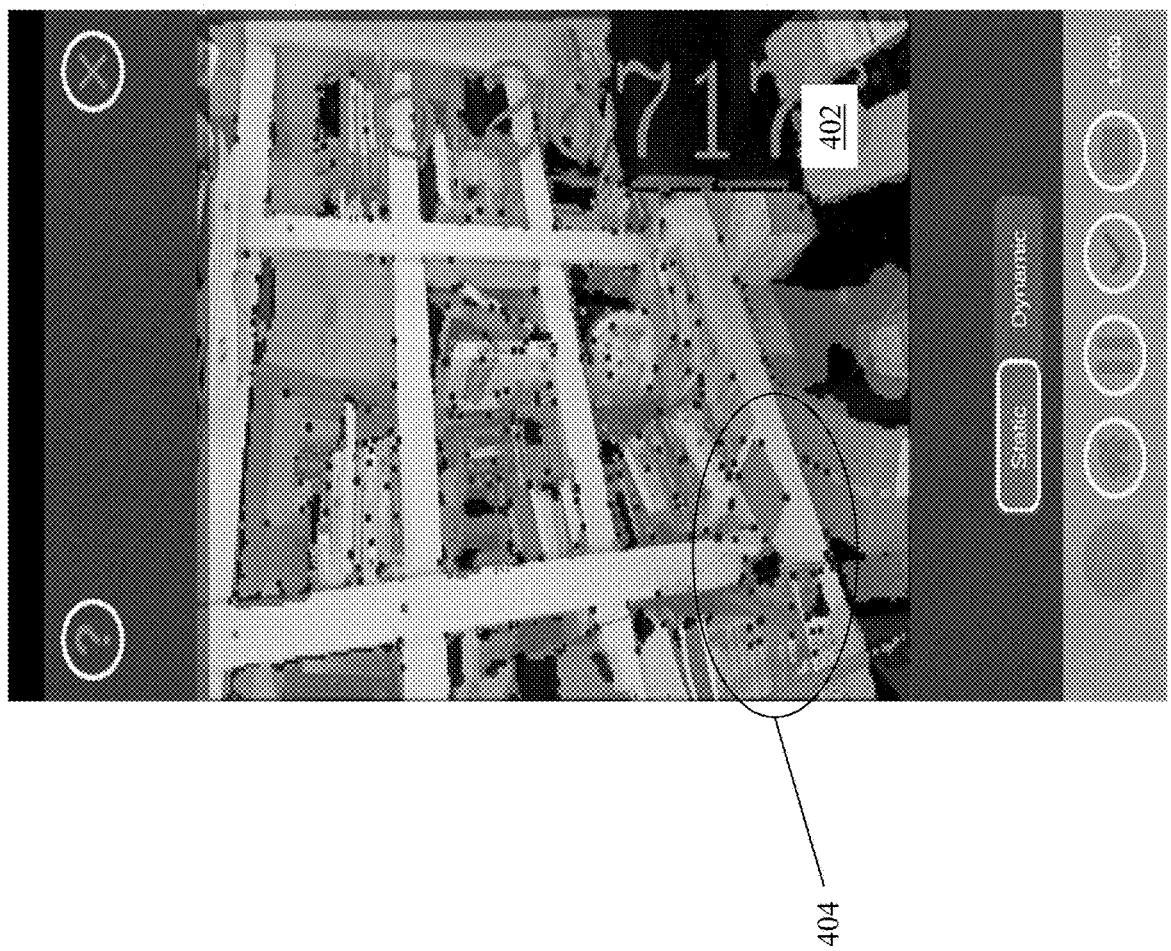
FIG. 4 is an exemplary screenshot of an image captured by the image processing module 103*a* showing detected and matched feature points during the tracking step

For SLAM tracking, the image processing module 103a uses an existing map to estimate the sensor's 102 current position. The image processing module 103a captures a current image from camera 102, detects feature points in the current image (e.g. using a corner detection algorithm such as features from accelerated segment test (FAST) as described in Rosten et al., "Faster and better: a machine learning approach to corner detection," IEEE Trans. Pattern Analysis and Machine Intelligence (Oct. 14, 2008) available at arxiv.org/pdf/0810.2434, which is incorporated herein by reference), and matches the feature points to 3D points within the map based on a feature descriptor such as ORB (as described in E. Rublee et al., "ORB: an efficient alternative to SIFT or SURF," ICCV '11 Proceedings of the 2011 International Conference on Computer Vision, pp. 2564-2571 (2011), which is incorporated herein by reference). FIG. 4 is a screenshot 400 of an image 402 captured by the image processing module 103a showing detected and matched feature points 404 during the tracking step. As shown in FIG. 4, the image processing module 103a detects a plurality of feature points 404 (as represented by the black dots) on various objects in the captured image 402. The image processing module 103a then optimizes the estimated pose of the sensor 102 by minimizing an error when projecting the 3D points to their 2D feature matches via a nonlinear optimization algorithm such as Levenberg-Marquardt (a summary of which is provided in H. Gavin, "The Levenberg-Marquardt algorithm for nonlinear least squares curve-fitting problems," available from people.duke.edu/~hpgavin/ce281/lm.pdf (2020), which is incorporated herein by reference). If the map is not yet well defined at the current location, the tracking process saves the current frame as a keyframe and provides the keyframe to the mapping process.

Mapping (FIG. 3, Step 302B)

Figure 5:
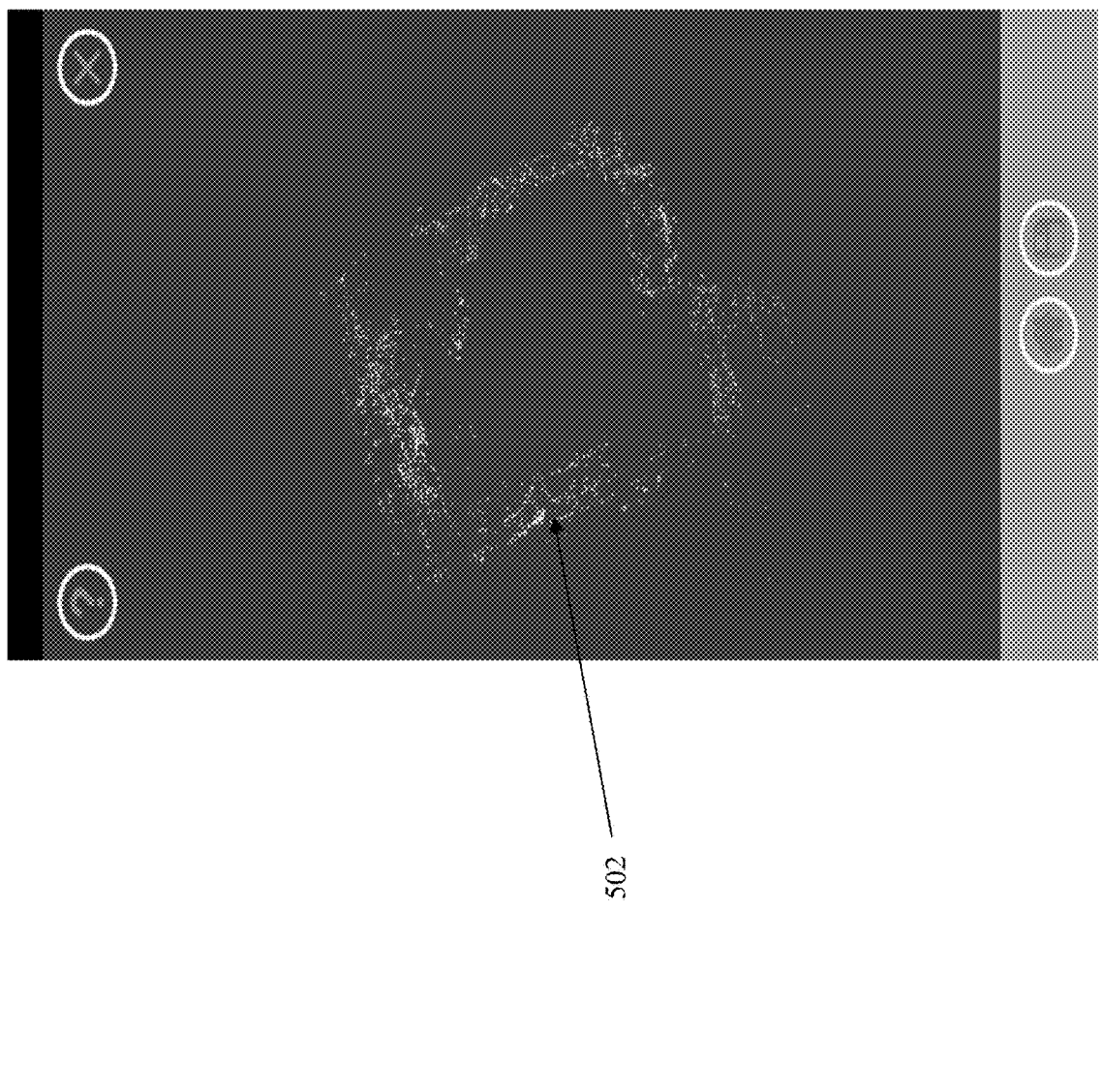
FIG. 5 is an exemplary screenshot of a set of 3D map points of a dynamic scene.

The image processing module 103a then creates a map by constantly accepting new keyframes and matching them to 3D points, which are in turn matched to other keyframes. The difference between the 2D features in a keyframe and the projected position of its matching 3D point is due to errors in the pose of the keyframes and the 3D point locations. The mapping process constantly optimizes these variables by minimizing this reprojection error. The final result is a set of 3D map points representing the scanned environment with low positional error. FIG. 5 is a screenshot 500 of a set of 3D map points 502 of a dynamic scene (e.g. a room). As shown in FIG. 5, the 3D map feature points 502 represent the environment as captured by the camera 102. The image processing module 103a also has good pose estimates for each keyframe. Using either multi-view stereo or RGBD point cloud information, the image processing module 103a can construct a dense mesh that recreates the scene via, e.g., Poisson Reconstruction. An exemplary Poisson Reconstruction technique is described in M. Kazhdan et al., "Poisson Surface Reconstruction," Eurographics Symposium on Geometry Processing (2006), available at hhoppe.com/poissonrecon.pdf, which is incorporated herein by reference. The image processing module 103a saves the 3D map points for use in the localization process while the image processing module 103a transmits the mesh to the 3D model reconstruction module 106a of computing device 106 for rendering (e.g. via AR/VR headset 110) to the tele-operator.

Localization (FIG. 3, Step 304)

The robot 101 uses a copy of the map during operation to orient itself. The robot 101 (e.g., via robot control module 103b) detects keypoints in incoming camera 102 data and matches them to keypoints in the map in the same way that the image processing module 103a does as described above. In some embodiments, the image processing module 103a performs the above-referenced initial mapping step 302 and provides map information to the robot control module 103b for processing into instructions to control the robot 101. In some embodiments, the robot control module 103b (either alone or in conjunction with the image processing module 103a) performs a distinct tracking step (e.g. step 304A) for the robot 101. The image processing module 103a and/or the robot control module 103b can then find the current pose of the robot 101 by minimizing the reprojection error of the keypoints. The computing device 103 then transmits the updated pose along with the sensor 102 data to the 3D model reconstruction module 106a of computing device 106.

Tracking (FIG. 3, Step 304A)

As mentioned above, tracking during localization is identical to tracking during SLAM (as described above with respect to step 302A) except the map is never updated unless the scene changes. In a changing scene, tracking can also utilize the non-rigid tracking and object tracking to deal with changing scene and/or moving objects within the scene. In the dynamic scene, the image processing module 103a constantly updates the mapping with the scene changes and new location(s) of the object(s) as they move in the scene.

Data Streaming (FIG. 3, Step 304B)

The image processing module 103a localizes every frame from the camera 102 via tracking. The module 103a then attaches the pose to the camera frame, compresses the image data, and transmits the frame and metadata to the 3D model reconstruction module 106a of computing device 106. The image processing module 103a also sends information about the matches used and estimated error of tracking to aid registration on the tele-operator's end.

Rendering Merged Data (FIG. 3, Step 306)

As can be appreciated, the 3D model reconstruction module 106a of computing device 106 now has an identical copy of the map in the form of a 3D textured mesh. Each frame of data received by the 3D model reconstruction module 106a comes with a pose identifying the robot's 101 position within the map as well as the changes in the scene and updated location of any object(s) in the scene. The 3D model reconstruction module 106a uses this pose along with additional keypoint matches and dense point cloud information to align the camera imagery with the texture and geometry of the map. As described below, the 3D model reconstruction module 106a then renders the map and aligned data as a 3D model in the AR/VR headset 110 from whatever viewpoint the tele-operator requests.

Registration (FIG. 3, Step 306A)

As mentioned above, the 3D model reconstruction module 106a receives camera images generated by the image processing module 103a during the localization processes (steps 304A and 304B) along with a pose and a set of feature matches. This data provides the 3D model reconstruction module 106a with an initial registration that roughly aligns the sensor data with the map. In order to merge the imagery in a visually satisfying manner, the module 106a needs to compensate for pose and calibration error. To do this, the 3D model reconstruction module 106a uses keypoints and dense point clouds to register the incoming image(s) to points on the mesh in a less constrained manner. A detailed workflow of the registration step 306A is provided in FIG. 6.

Figure 6:
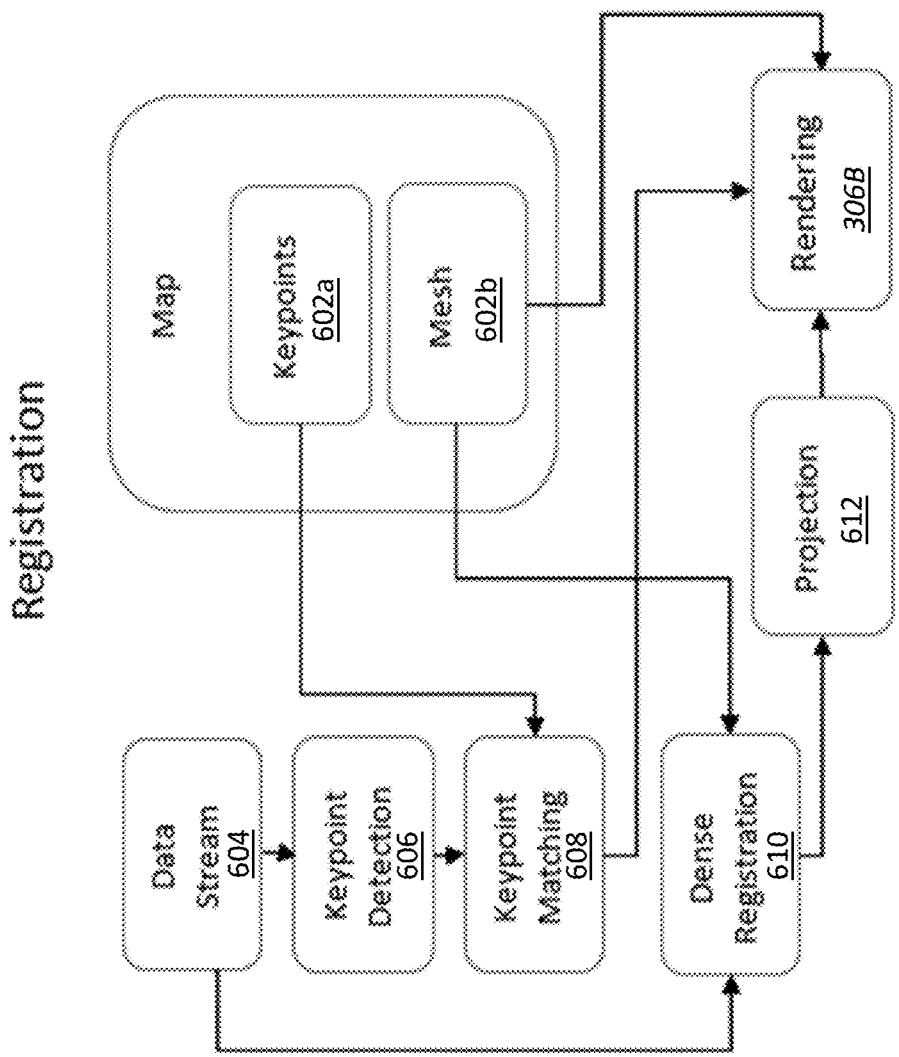
FIG. 6 is a detailed flow diagram of a registration method performed by the system.

As shown in FIG. 6, the module 106a begins with a set of 3D map keypoints 602 and a mesh 604 describing the scene. When the module 106a receives a new camera 102 image from image processing module 103a of computing device 103 via the data stream (step 604), the module 106a detects keypoints (step 606) using e.g. the FAST corner detection algorithm referenced above. The module 106a then matches keypoints (step 608) to the stored 3D map points based on their descriptors as calculated via e.g. the ORB feature descriptor algorithm described previously. The 3D model reconstruction module 106a then matches the dense point cloud associated with the input frame to the scene mesh using, e.g., an Iterated Closest Point (ICP) algorithm (step 610). Exemplary ICP algorithms and techniques are described in K. S. Arun et al., "Least-squares fitting of two 3-D point sets," IEEE Transactions on Pattern Analysis and Machine Intelligence (PAMI) Vol. 9, No. 5, 698-700 (1987); P. Besl and N. McKay, "A Method for Registration of 3-D Shapes," IEEE Transactions on Pattern Analysis and Machine Intelligence, Vol. 14, No. 2, 239-256, (1992); and Y. Chen and G. Medioni, "Object Modeling by Registration of Multiple Range Images," Proceedings of the 1991 IEEE International Conference on Robotics and Automation, April 1991, each of which is incorporated herein by reference. The module 106a then uses the dense registration and keyframe matches to define a projection (step 612) that maps the input color image onto the mesh surface. The module 106a updates the texture of the mesh by this projected image, altering the model to more closely resemble the actual environment of the robot.

Rendering (FIG. 3, Step 306B)

As can be appreciated, the static map comprises a set of triangles in 3D space creating a mesh and texture data describing the surface of the triangles. The 3D model reconstruction module 106a replaces the existing texture with the latest camera image according to the location of where that image projects onto the mesh. The module 106a then blends the imagery (e.g. using Poisson blending) into the existing texture to create a single seamless scene. An exemplary Poisson blending technique used by the module 106a is described at en.wikipedia.org/wiki/Gradient-domain image processing, incorporated herein by reference.

Changing Scene (Dynamic Scene)

As can be appreciated, scenes change over time, either due to non-rigid structures or objects moving within the scene. Therefore, the system 100 should ensure that the displayed scene geometry matches the current deformation sensed by the robot 101. The system 100 should also detect and track objects within the scene and separate them from the static map.

Figure 7:
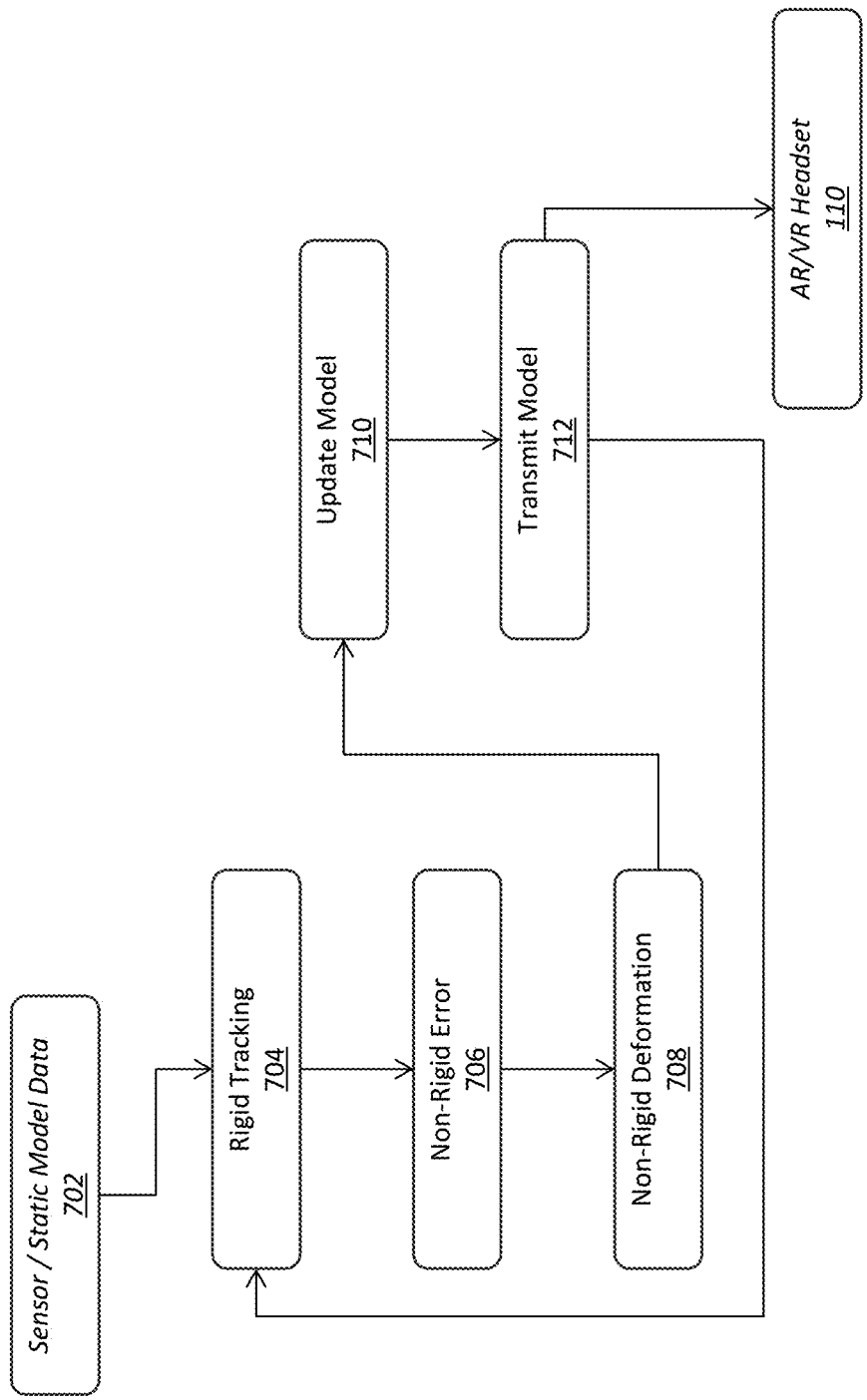
FIG. 7 is a flow diagram of a computerized method for enabling the generation and display of dynamic scenes in telerobotics.
Figure 8:
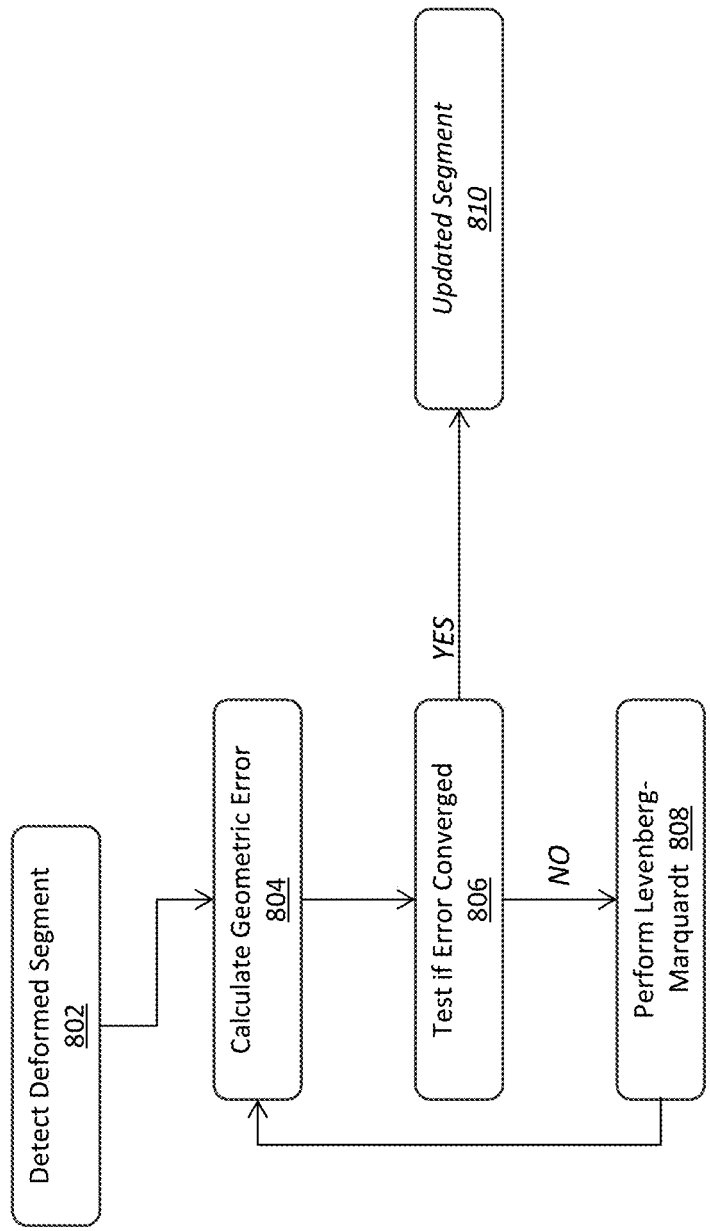
FIG. 8 is a flow diagram of a computerized method of non-rigid deformation of the dynamic scene model.

FIG. 7 is a flow diagram of an exemplary computerized method 700 for enabling the generation and display of dynamic scenes in telerobotics, using the system 100 of FIG. 1. As shown in FIG. 7:

Input (702): the image processing module 103a of computing device 103 receives depth and color data from robotic sensor 102 and generates the reconstructed static scene model. For example, robot 101/sensor 102 sends depth and color data to computing device 103, which includes hardware and software (e.g. module 103a) in order to handle the computationally expensive processing;

Step 704: the image processing module 103a tracks the robot 101 pose by rigidly matching robotic depth and color data against the scene model;

Step 706: the module 103a detects the non-rigid/dynamic scene by comparing the robotic depth data and the scene model. In some embodiments, the module 103a classifies segments of the scene model which have large geometric error against the depth data as dynamic segments;

Step 708: the module 103a non-rigidly deforms the scene model (i.e., only the dynamic segments as classified in Step 706) to the robotic depth data using a non-rigid SLAM technique. FIG. 8 is a flow diagram of a computerized method 800 of non-rigid deformation of the scene model, using the system 100 of FIG. 1. As shown in FIG. 8, for the non-rigid deformation method 800, the module 103a detects a deformed (dynamic) segment (step 802); and performs alternating steps of calculating a geometric error between the scene model and the depth data (step 804), determining if the geometric error converged (step 806), and modifying the scene model using a non-linear optimization based on the Levenberg-Marquardt algorithm described above (step 808) if the error did not converge, or generating the updated scene model if the error converged (step 810).

Step 710: once the image processing module 103a has updated the scene model geometrically, the module 103a updates the model's texture by aligning the scene model to the robotic color data. In some embodiments, to obtain a seamless texture, the module 103a applies Poisson blending (referenced above) to smooth out a boundary of the existing texture and the updated texture.

Step 712: the image processing module 103a transmits the robot pose and the updated scene model to the 3D model reconstruction module 106a to display to the tele-operator via the AR/VR headset 110. In some embodiments, to minimize the amount of data required, the module 103a transmits only the net changes to the scene as well as the poses of the moving objects to the 3D model reconstruction module 106a.

Further details regarding non-rigid SLAM processing is described in U.S. patent application Ser. No. 16/867,196, filed on May 5, 2020, which is incorporated herein by reference in its entirety.

Asynchronous Control

Operating a robot remotely introduces bi-directional network-based lag in sending sensor data to the user and receiving commands back based on that data. As lag increases, direct control becomes impossible. Instead, the system 100 enables the tele-operator to specify actions to perform on objects present in the scene and have the robot 101 carry out those operations based on the robot's 101 own understanding of the location of those objects. For example, if the tele-operator wants to pick up an object, the tele-operator simply points to the object using the VR/AR controller 112. The image processing module 103a tracks the object relative to the scene and instructs the robot 101 (via robot control module 103b) to pick up the object at its current location relative to the robot 101. Therefore, even when the object has moved, the object tracking allows the robot 101 to precisely pick up the object. The same concept applies to a non-rigid scene, such as movements of human tissue during surgery if a doctor is using a telerobotic surgical instrument to mark and operate on a particular location.

Visualization for the Tele-Operator

As mentioned above, for visualization, the tele-operator can use AR or HM HMDs (head mounted displays) 110 with scene tracking capability such as Oculus™ Quest VR™ or Microsoft® Hololens™—which have six-degree of freedom (6DoF) movement. Therefore, when the tele-operator moves his or her head, the scene is rendered from the correct viewing angle—as if the user is at the robot location. The viewing is instant and realistic because the replica of the robot location is being rendered as a photorealistic 3D animation. This provides the true 'immersive' experience the user needs in order to correctly operate the robot.

Robot Control

Figure 9A:
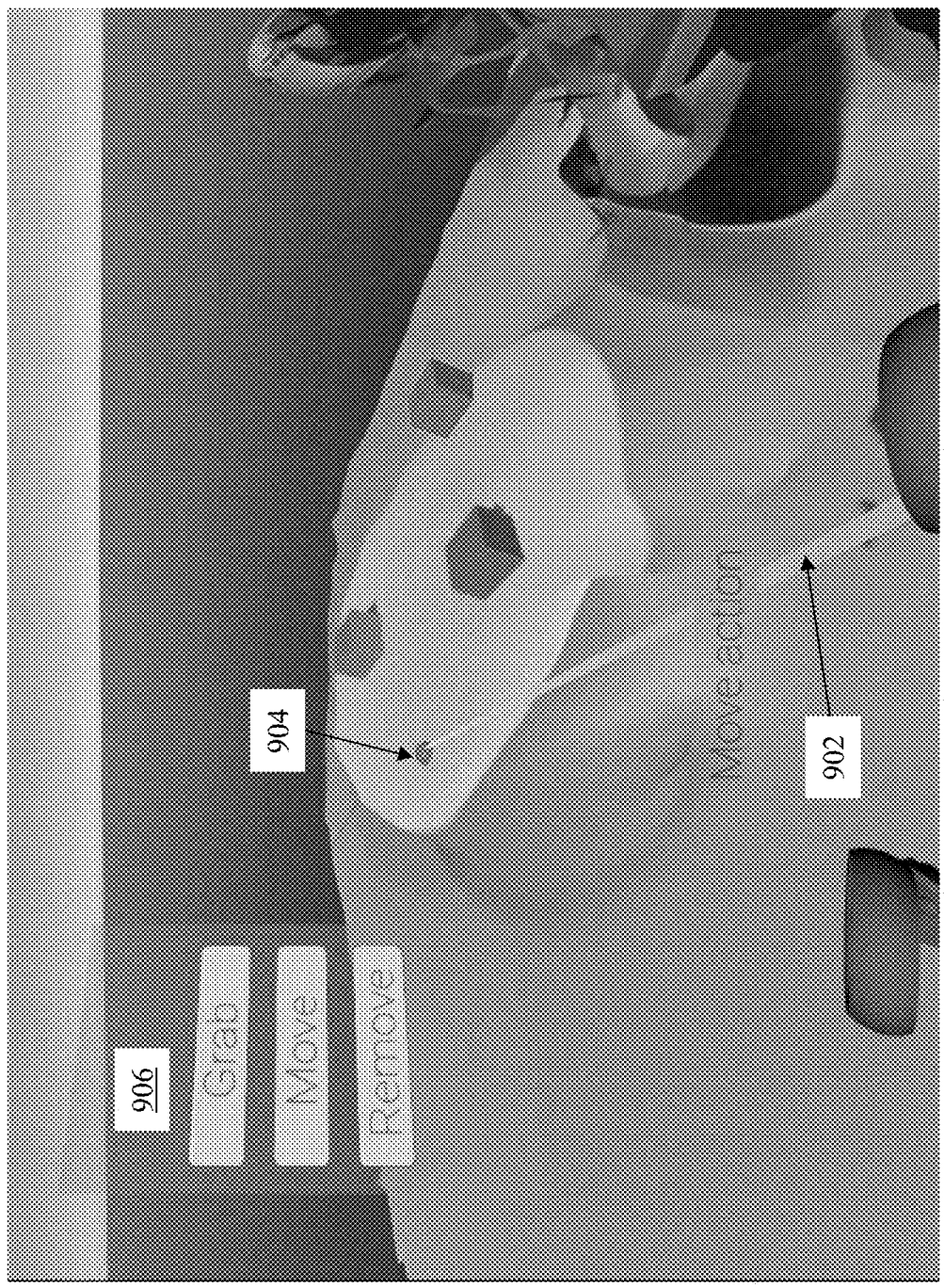
FIGS. 9A and 9B are exemplary screenshots of a command selection screen displayed in the AR/VR headset.
Figure 9B:
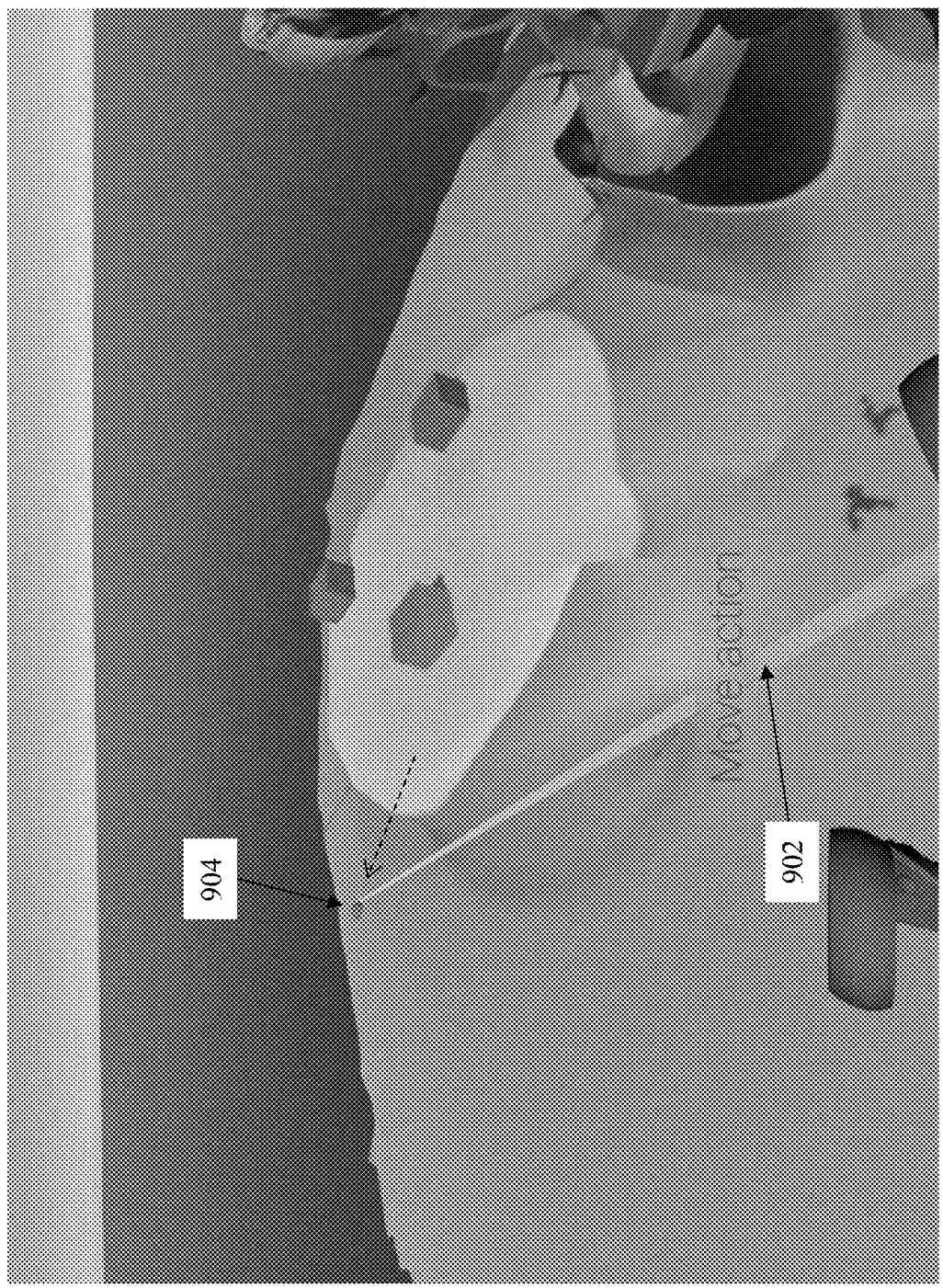

To control the robot itself, the tele-operator can use the AR/VR controller 112, a gesture controller such as the Ultraleap controller available from Ultrahaptics (ultraleap.com), or something more sophisticated like a haptic hand controller (e.g. Tactile Telerobot available from Shadow Robot Company of London, UK) which can emulate hand-finger movements and pressure feedback. Because the scene around the robot 101 has been completely replicated to the tele-operator in the virtual environment displayed in the AR/VR headset 110, the movements or controller positions are totally mirrored to that of the scene at the robot 101 (except that such movements are delayed by the network delay). Therefore, any control actions the user takes feel completely natural as if the user is at the robot location. In some embodiments, the system 100 can achieve basic robot control with a number of input methods. For example, the AR/VR controller 112 enables the tele-operator to give commands semantically by selecting an object, either by touching it or selecting it with a pointing device, bringing up a menu of available actions, and selecting the desired action. FIG. 9A is a screenshot of an exemplary command selection screen displayed in the AR/VR headset 110. As shown in FIG. 9A, the tele-operator can use the controller 112 to point to an object 904 (using pointer 902) and select one or more commands from a menu 906 (e.g. grab object 904 and move object 904 to another location). The result of the tele-operator's commands are shown in the screenshot of FIG. 9B, where the object 904 has moved to a new location. The robot command module 106b translates these selected commands into instructions that the robot can act upon and transmits the commands to the robot control module 103b, which provides the commands to the robot 101 to carry out the corresponding action(s) asynchronously.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more specialized processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A system for providing virtual presence for telerobotics in a dynamic scene, the system comprising:

a remote viewing device and a remote controller coupled to the remote viewing device;

a sensor device that captures one or more frames of a scene comprising one or more objects, each frame comprising (i) one or more color images of the scene and the one or more objects and (ii) one or more depth maps of the scene and the one or more objects;

a computing device coupled to the sensor device, the computing device comprising a memory that stores computer-executable instructions and a processor that executes the instructions to:

receive a first set of frames from the sensor device;

for each frame in the first set of frames:

generate a set of feature points corresponding to the one or more objects in the scene, match the set of feature points to one or more corresponding 3D points in a depth map from the frame, and construct a dense mesh of the scene and the one or more objects using the matched feature points;

receive a second set of frames from the sensor device;

for each frame in the second set of frames:
a) calculate a geometric error between one or more segments of the dense mesh and corresponding 3D points in a depth map from the frame,
b) classify one or more segments of the dense mesh as one or more dynamic segments based on the geometric error calculated for the one or more segments,
c) non-rigidly deform only the one or more segments of the dense mesh that are classified as the one or more dynamic segments using data associated with the corresponding 3D points in the depth map from the frame,
d) calculate a second geometric error between the deformed one or more dynamic segments and corresponding 3D points in the depth map from the frame,
e) modify the deformed dense mesh using a non-linear optimization if the second geometric error does not converge,
f) repeat steps d) and e) until the second geometric error converges, and
g) update a texture of the deformed dense mesh by aligning a color image from the frame to the deformed dense mesh; and determine net changes to the dense mesh resulting from the non-rigid deformation and transmit (i) the net changes to the dense mesh of the scene and the one or more objects and (ii) the frame to the remote viewing device, wherein the remote viewing device configured to:

update an existing 3D representation of the scene and the one or more objects using the net changes to the dense mesh and the frame for display to a user;

receive one or more commands from the user via the remote controller, the one or more commands corresponding to interaction with the one or more objects in the updated 3D representation of the scene, and transmit the one or more commands to a robot device, and wherein the robot device is configured to:

execute the one or more commands received from the remote viewing device to perform one or more operations.

2. The system of claim 1, wherein generating the set of feature points corresponding to the one or more objects in the scene comprises detecting one or more feature points in the frame using a corner detection algorithm.

3. The system of claim 2, wherein matching the set of feature points to the one or more corresponding 3D points in the depth map from the frame comprises using a feature descriptor to match the set of feature points to the one or more corresponding 3D points.

4. The system of claim 1, wherein matching the set of feature points to the one or more corresponding 3D points in the depth map from the frame comprises minimizing a projection error between each feature point and one or more corresponding 3D points.

5. The system of claim 4, wherein the minimizing the projection error is performed using a nonlinear optimization algorithm.

6. The system of claim 1, wherein the updating the existing 3D representation of the scene and the one or more objects using the net changes to the dense mesh and the frame comprises:
   detecting one or more keypoints of one or more objects in the scene using the received frame;
   matching the detected one or more keypoints to one or more 3D points in a stored map to generate a point cloud;
   updating the generated point cloud using the net changes to the dense mesh received from the computing device; and
   mapping the frame onto a surface of the generated point cloud to update the 3D representation.

7. The system of claim 6, wherein updating the generated point cloud using the net changes to the dense mesh is performed using an Iterative Closest Point (ICP) algorithm.

8. The system of claim 6, wherein the 3D representation comprises a textured mesh of the scene and the one or more objects in the scene.

9. The system of claim 1, wherein the remote viewing device comprises an augmented reality (AR) viewing apparatus, a virtual reality (VR) viewing apparatus, or a mixed reality (MR) viewing apparatus.

10. The system of claim 9, wherein the remote viewing device is worn by the user.

11. A computerized method for providing virtual presence for telerobotics in a dynamic scene, the method comprising:
    capturing, by a sensor device, one or more frames of a scene comprising one or more objects, each frame comprising (i) one or more color images of the scene and the one or more objects and (ii) one or more depth maps of the scene and the one or more objects;
    receiving, by a computing device coupled to the sensor device, a first set of frames from the sensor device;
    for each frame in the first set of frames:
    generating, by the computing device coupled to the sensor device, a set of feature points corresponding to the one or more objects in the scene,
    matching, by the computing device, the set of feature points to one or more corresponding 3D points in a depth map from the frame, and
    constructing, by the computing device, a dense mesh of the scene and the one or more objects using the matched feature points;
    receiving, by the computing device, a second set of frames from the sensor device;
    for each frame in the second set of frames:
    a) calculating, by the computing device, a first geometric error between one or more segments of the dense mesh and corresponding 3D points in a depth map from the frame,
    b) classifying, by the computing device, one or more segments of the dense mesh as one or more dynamic segments based on the first geometric error calculated for the one or more segments, c) non-rigidly deforming, by the computing device, only the one or more segments of the dense mesh that are classified as the one or more dynamic segments using data associated with the corresponding 3D points in the depth map from the frame, d) calculate a second geometric error between the deformed one or more dynamic segments and corresponding 3D points in the depth map from the frame, e) modify the deformed dense mesh using a non-linear optimization if the second geometric error does not converge, f) repeating, by the computing device, steps d) and e) until the second geometric error converges, and g) updating, by the computing device, a texture of the deformed dense mesh by aligning a color image from the frame to the deformed dense mesh;

determining, by the computing device, net changes to the dense mesh resulting from the non-rigid deformation and transmitting (i) the net changes to the dense mesh of the scene and the one or more objects and (ii) the frame to a remote viewing device, the remote viewing device coupled to a remote controller;

updating, by the remote viewing device, an existing 3D representation of the scene and the one or more objects using the net changes to the dense mesh and the frame for display to a user;

receiving, by the remote viewing device, one or more commands from the user via the remote controller, the one or more commands corresponding to interaction with the one or more objects in the updated 3D representation of the scene;

transmitting, by the remote viewing device, the one or more commands to a robot device that interacts with the one or more objects in the scene; and executing, by the robot device, the one or more commands received from the remote viewing device to perform one or more operations.

12. The method of claim 11, wherein the generating the set of feature points corresponding to the one or more objects in the scene comprises detecting one or more feature points in the frame using a corner detection algorithm.

13. The method of claim 12, wherein the matching the set of feature points to the one or more corresponding 3D points in the depth map from the frame comprises using a feature descriptor to match the set of feature points to the one or more corresponding 3D points.

14. The method of claim 11, wherein the matching the set of feature points to the one or more corresponding 3D points in the depth map from the frame comprises minimizing a projection error between each feature point and one or more corresponding 3D points.

15. The method of claim 14, wherein the minimizing the projection error is performed using a nonlinear optimization algorithm.

16. The method of claim 11, wherein the updating the existing 3D representation of the scene and the one or more objects using the net changes to the dense mesh and the frame comprises:

detecting one or more keypoints of one or more objects in the scene using the received frame;

matching the detected one or more keypoints to one or more 3D points in a stored map to generate a point cloud;

updating the generated point cloud using the net changes to the dense mesh received from the computing device; and mapping the frame onto a surface of the generated point cloud to update the 3D representation.

17. The method of claim 16, wherein updating the generated point cloud using the net changes to the dense mesh is performed using an Iterative Closest Point (ICP) algorithm.

18. The method of claim 16, where in the 3D representation comprises a textured mesh of the scene and the one or more objects in the scene.

19. The method of claim 11, wherein the remote viewing device comprises an augmented reality (AR) viewing apparatus, a virtual reality (VR) viewing apparatus, or a mixed reality (MR) viewing apparatus.

20. The method of claim 19, wherein the remote viewing device is worn by the user.

* * * * *